UNITED STATES PATENT OFFICE.

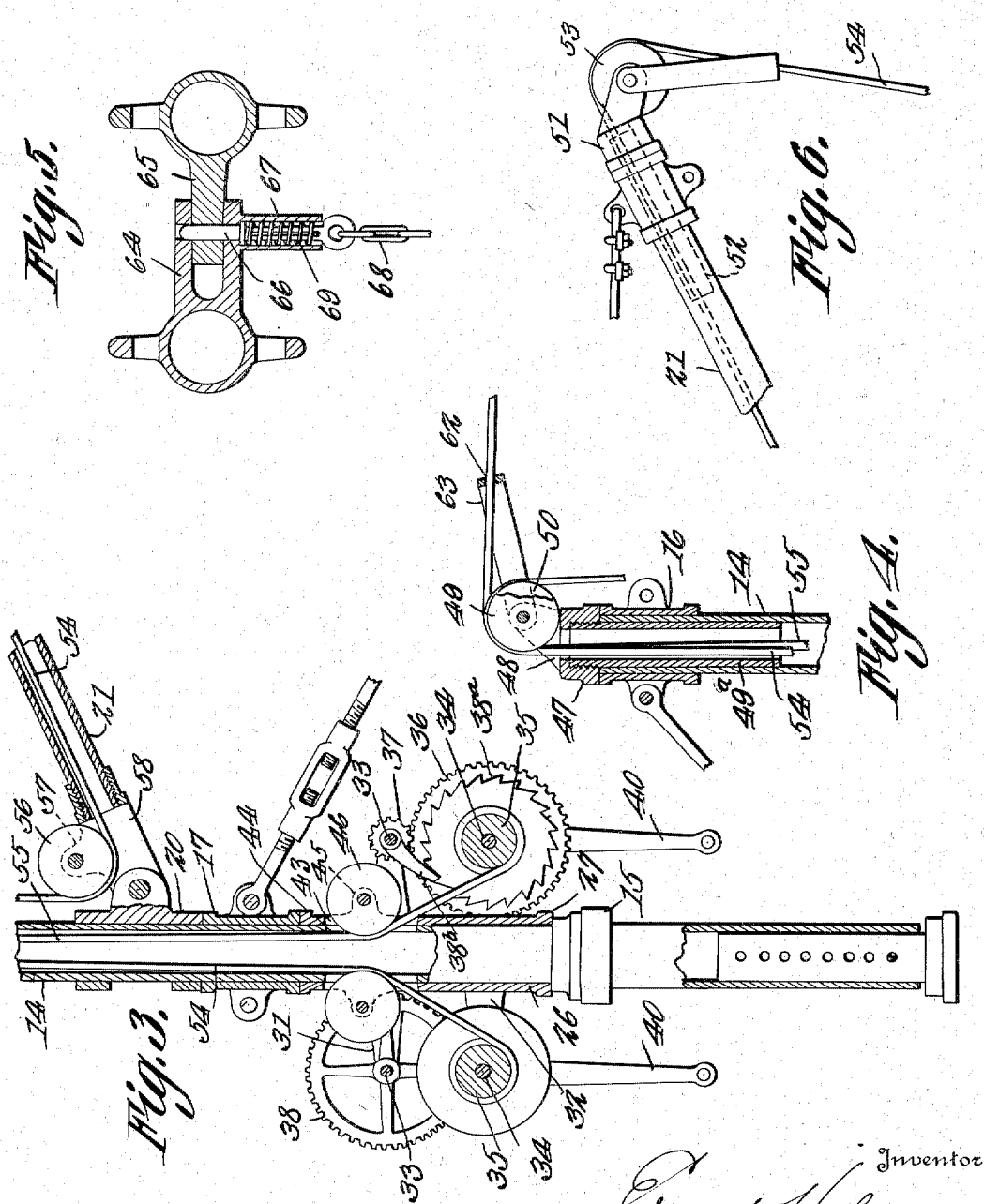

ERNEST HOLMES, OF CHATTANOOGA, TENNESSEE.

HOISTING APPARATUS FOR AUTOMOBILES.

1,254,804.  Specification of Letters Patent.  Patented Jan. 29, 1918.

Application filed November 16, 1917. Serial No. 202,292.

*To all whom it may concern:*

Be it known that I, ERNEST HOLMES, a citizen of the United States of America, and resident of Chattanooga, in the county of Hamilton and State of Tennessee, have invented certain new and useful Improvements in Hoisting Apparatus for Automobiles, of which the following is a specification.

This invention relates to derricks and particularly to a vehicle derrick, the same being designed especially as an attachment for an automobile and of special utility in connection with the raising or hoisting of disabled automobiles and the transportation of such automobiles so that an automobile equipped with the hoisting apparatus embodying this invention can lift an automobile from positions where it is disabled and can carry or transport it to the place for repair.

A further object of this invention is to produce an apparatus which will stabilize or brace the body of the automobile transversely, thus doing away with an oscillatory movement even though the cranes or hoisting devices project at right angles to the side of the automobile, the said bracing means being movable so that it can be elevated and held in elevated position when the automobile containing it is being moved.

A still further object of this invention is to produce a hoisting apparatus with braces extending longitudinally of the automobile so that a strong and durable structure which will prove efficient and satisfactory in use will result.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Fig. 3 illustrates a sectional view of one of the standards and a fragment of an arm;

Fig. 4 illustrates a sectional view of the upper end of a post or standard;

Fig. 5 illustrates a detail sectional view of means for securing the arms; and

Fig. 6 illustrates a view in elevation of the outer end of one of the arms.

Figure 1:
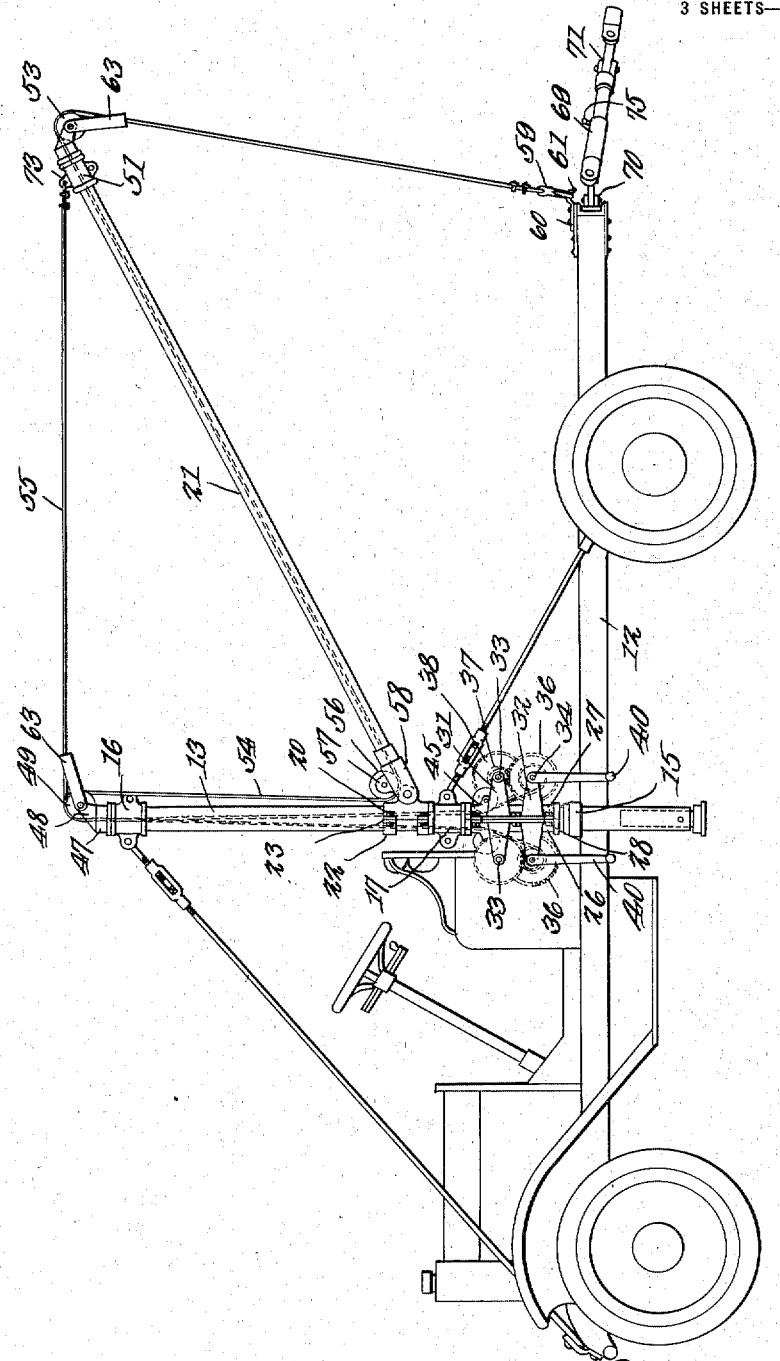
Figure 1 illustrates a view in elevation of an automobile truck with the invention applied thereto.
Figure 2:
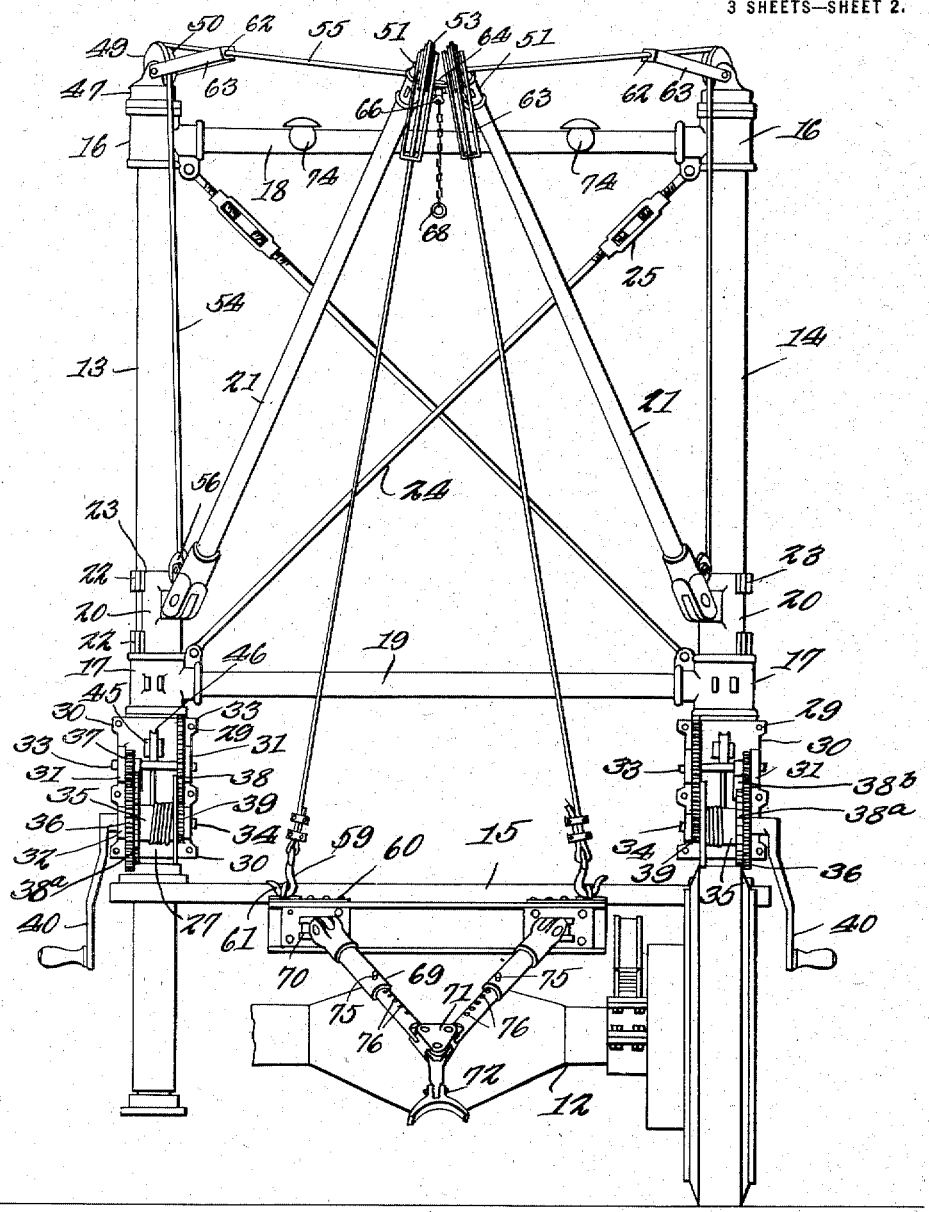
Fig. 2 illustrates a rear view of the hoisting apparatus and a fragment of the truck.

In these drawings 12 denotes an automobile truck which may be of any appropriate type to which the hoisting mechanism may be applied, the said hoisting mechanism in the present embodiment of the invention comprising two posts or masts 13 and 14, one of which is on each side or near each side of the truck frame and supported on said truck frame by a cross beam 15 or in any appropriate manner, and the said masts 13 and 14 are connected together as will presently appear to form a framelike structure so that the structure is rigid and strong.

As the masts and parts associated with them are duplicated on each side of the truck, a description of one mast and the mechanism associated with it will suffice as a description of the two masts and associated parts. A T-coupling 16 is secured on the upper end of the mast and a T-coupling 17 is secured near the lower end of the mast, the said T-couplings engaging the strut rods 18 and 19 respectively which are attached to like couplings on the other mast for making the framelike structure. A shoulder is formed by the collar of the coupling 17 and it constitutes a bearing for a bracket 20 on which the arm 21 is pivoted, the said bracket 20 being rotatably held on the mast by clips 22 which are bolted to lugs 23 formed on the bracket.

Couplings 16 and 17 have apertured lugs to which the brace rods 24 are connected, the said brace rods extending diagonally and preferably being provided with turn buckles 25 by which their tension may be adjusted. The masts are hollow and cables, to be presently described, are run through them and the arms 21 may have mountings which rotate, as will presently appear.

The hoisting mechanism comprises, in the present embodiment of the invention, parts which are duplicated on each of the masts and in this connection I employ collar sections 26 and 27 which are clamped around the mast by fastenings 28 which enter apertures 29 in flanges 30 of the collar sections. Each collar section has pairs of arms 31 and 32 and shafts 33 and 34 are mounted in the said pairs of arms respectively. A drum 35 is freely rotatable on the shaft 34 and the said drum has a pinion 36 on it which is engaged by a gear wheel 37 on the shaft 33. A pinion 38 is also mounted on the shaft 33 and the pinion is rotated by a gear wheel 39 keyed on the shaft 34, the said shaft 34 being rotated by a crank handle 40 or by other means. The brackets or arms on the other collar section have duplicated parts similar to those just described, it being understood that one of the drums is intended for winding and unwinding the cable 54 and the other drum is intended to wind and unwind the cable 55.

Each collar section has an aperture 43 which alines with an aperture 44 in the mast and each collar section is also supplied with apertured lugs 45 in connection with which a guide wheel 46 is mounted, so that each cable will run over one of the guide pulleys and through the apertures of the collar section and mast in its travel from the drum to the mast.

The upper end of each mast is supplied with a head 47 having brackets 48 in which pulleys 49 and 50 are journaled or rotatably mounted and each head has a gudgeon 49ª which extends into the mast so that it may rotate to permit the head to turn so that the pulleys will be moved to compensate for movement of the arms 21.

Each arm has a head 51 with a gudgeon 52 rotatable in the end of the arm and each head has a pulley 53 rotatable on it over which a cable is run. It is immaterial which of the cables is operated in conjunction with one of the drums but for the purposes of illustration, the cable 54 will be said to operate over the front drum and the cable 55 will be said to operate over the rear drum. The cable 54 as shown runs over a pulley at the top of the mast and then is threaded downward over a pulley 56 journaled in lugs 57 of the coupling 58 by which the arm 21 is pivoted to the bracket 20. The said cable 54 is then threaded through the hollow arm and over the pulley 53 at the outer end of said arm, the said cable terminating in a hook 59 or other means of attachment to the load. When the device is not in operation, and it is desired to transport the device, the hooks are preferably anchored to plates 60 through the medium of the hooks 61.

As a means for preventing the cables from climbing from the grooves of the pulleys, they are run through apertures 62 of the guides 63, the said guides being pivotally connected to the head and they may be pivoted on the journals or shafts on which the pulleys rotate. The use of the guides 63 insures the proper trunnioning of the gudgeons as the load swings with relation to the masts or arms and hence the cables are kept in alinement with the said pulleys.

When a load has been raised at the rear of a truck as for instance when a wrecked automobile is to be towed by elevating the front of the automobile and depending upon the rear truck for supporting the said wrecked automobile while it is being towed, there is a certain amount of oscillatory movement imparted to the towed vehicle and in order to obviate oscillatory movement of the supporting means, the arms should be held together or coupled approximately at the transverse center of the truck and when this is done, the arms constitute diagonally extending braces and oscillatory movement of the arms is obviated, hence the load is held more stable.

In order to couple the arms together, one of the heads is provided with apertured lugs 64 which are in spaced relation to each other and the head of the other arm has an apertured lug 65 which passes between the lugs of the other head and they are coupled together by a spring-held pin 66 which enters the apertures of the lugs. One of the lugs 64 has a hollow boss 67 formed on it which constitutes a housing for the spring 69 which is utilized to urge the pin normally inward so that it constitutes a latch for holding the lugs together. When it is desired to release the lugs, the pin may be drawn outward by a pull on the flexible member 68.

A draw bar is also used in connection with the truck and in order to prevent oscillatory movement of the towed vehicle, I prefer to utilized arms 69 which are pivotally connected to brackets 70 on the truck. The arms converge and are pivotally connected to a head 71 so that there is a bracing action of the arms due to their divergence. Any suitable coupling 72 may be pivotally connected to the head 71 for the purpose of attaching it to the vehicle so that the said vehicle may be drawn and at the same time held from running up on the truck under its momentum or while going down a grade. The arms 69 are telescopic and one member is adjusted with relation to the other by reason of the holes 75 in one member which receive a pin 76 carried by the other member.

The arms 21 may of course be swung to extend at right angles to the truck and one of the cables can be used as a guy or anchorage to prevent tilting of the hoisting mechanism if a load is to be dragged from the side of the road or elevated by an arm which projects over the side of the truck. The cable 55 is coupled to a lug 73 of the head on the outer end of the arm 21 and the said cable is employed for elevating or lowering the said arm and for holding it at different positions of adjustment. The cable 54 is employed for attachment to a load or to an anchorage when used as a guy and the manner of its employment will, it is thought, be apparent, in that the cable at the side of the truck opposite that which is connected to the wrecked apparatus may be anchored to a tree, post or other object so as to prevent tilting of the truck or automobile while the load is being dragged or lifted.

The gear wheel 38 has a set of ratchet teeth $38^a$ on its side and the teeth are engaged by a dog $38^b$ which is pivoted on the shaft 33, so that the frame or load may be held at different positions of adjustment.

The frame and the parts associated with it may be supplied with suitable conductors of electricity leading to lamps, such as 74 for the purpose of illumination while the apparatus is being operated, and the lamps may be illuminated from the source of electricity usually present in automobile storage batteries.

I claim—

1. In a hoisting apparatus for automobiles, a truck, a frame mounted thereon including hollow posts, sectional collars clamped to the posts, arms on the sectional collars, hoisting gearing mounted on the said posts, cables operated by the said hoisting gearing and extending through the mast, a head trunnioned in the mast and having pulleys thereon for the engagement of the cables, a guide on each head through which one of the cables operates, arms, means for pivotally connecting the arms to the masts, cable guiding means on the outer ends of the arms, and means for holding the arms together.

2. In a hoisting apparatus for automobiles, a truck, a frame mounted thereon including hollow posts, sectional collars clamped to the posts, arms on the sectional collars, hoisting gearing mounted on the said posts, cables operated by the said hoisting gearing and extending through the mast, a head trunnioned in the mast and having pulleys thereon for the engagement of the cables, a guide on each head through which one of the cables operates, arms, means for pivotally connecting the arms to the masts, cable guiding means on the outer ends of the arms, apertured lugs on the outer ends of the said arms adapted to coact with each other, and means for coupling the lugs together.

3. In a truck, masts on the truck, sectional collars clamped to the masts, arms on the said sectional collars, hoisting gearing supported by the said posts, a cable operated by each hoisting gearing, an arm pivotally and oscillatingly mounted on one of the said masts, a cable moved by each of the hoisting mechanisms, one of the said cables being connected to one of the arms and the other of said cables operated to hoist the load, means for coupling the arms together at approximately the transverse center of the truck frame.

4. In a truck, masts on the truck, sectional collars clamped to the masts, arms on the said sectional collars, hoisting gearing supported by the said masts, a cable operated by each hoisting gearing, an arm pivotally and oscillatingly mounted on one of the said masts, a cable moved by each of the hoisting mechanisms, one of the said cables being connected to one of the arms and the other of said cables operating to hoist the load, apertured lugs on the outer ends of the said arms adapted to coact with each other, and means for coupling the lugs together.

ERNEST HOLMES.